United States Patent
Greenfield et al.

(10) Patent No.: US 7,668,200 B2
(45) Date of Patent: Feb. 23, 2010

(54) APPARATUS AND METHOD FOR LATENCY CONTROL IN A COMMUNICATIONS SYSTEM

(75) Inventors: Richard Greenfield, Cambridge (GB); Miguel Peeters, Mechelen (BE)

(73) Assignee: Broadcom Corporation, Irvine, CA (US)

( * ) Notice: Subject to any disclaimer, the term of this patent is extended or adjusted under 35 U.S.C. 154(b) by 570 days.

(21) Appl. No.: 10/880,769

(22) Filed: Jun. 30, 2004

(65) Prior Publication Data

US 2005/0025066 A1 Feb. 3, 2005

Related U.S. Application Data (60) Provisional application No. 60/483,623, filed on Jul. 1, 2003, provisional application No. 60/483,450, filed on Jun. 30, 2003.

(51) Int. Cl.
*H04J 3/16* (2006.01)

(52) U.S. Cl. .................. 370/468; 370/236; 370/493; 375/219; 375/358

(58) Field of Classification Search .......... 370/342, 370/347, 441, 465, 201, 203–204, 235–236, 370/320, 468, 493, 503; 375/130, 219, 222, 375/285, 294–296, 358, 362, 371, 373, 375–378
See application file for complete search history.

(56) References Cited

U.S. PATENT DOCUMENTS

| | | | |
|---|---|---|---|
| 5,400,322 A | | 3/1995 | Hunt et al. |
| 5,566,175 A | * | 10/1996 | Davis .................. 370/468 |
| 5,774,455 A | * | 6/1998 | Kawase et al. ........... 370/232 |
| 5,887,032 A | * | 3/1999 | Cioffi .................. 375/257 |
| 6,009,122 A | | 12/1999 | Chow |
| 6,122,246 A | * | 9/2000 | Marchok et al. ......... 370/208 |
| 6,240,094 B1 | | 5/2001 | Schneider |
| 6,266,347 B1 | * | 7/2001 | Amrany et al. .......... 370/478 |

(Continued)

FOREIGN PATENT DOCUMENTS

WO   WO 02/45275 A   6/2002

OTHER PUBLICATIONS

U.S. Appl. No. 10/706,285, filed Nov. 2003, Greenfield et al.

(Continued)

*Primary Examiner*—Aung S Moe
*Assistant Examiner*—Curtis A Alia
(74) *Attorney, Agent, or Firm*—Sterne, Kessler, Goldstein & Fox, P.L.L.C.

(57) ABSTRACT

The present invention provides a method for controlling transmission latency in a communications system, wherein the communications system is subject to a noise signal having at least a first noise phase and a second noise phase. The method includes determining a first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency; and transmitting symbols at the first bit rate during the first noise phase and at the second bit rate during the second noise phase. In other variants, the invention provides an apparatus, a constrained rate receiver, a transmitter and a signal.

16 Claims, 5 Drawing Sheets

U.S. PATENT DOCUMENTS

| | | | |
|---|---|---|---|
| 6,359,883 B1* | 3/2002 | Lechleider | 370/389 |
| 6,449,316 B1* | 9/2002 | Matsumoto et al. | 375/285 |
| 6,538,986 B2* | 3/2003 | Isaksson et al. | 370/207 |
| 6,580,752 B1* | 6/2003 | Amrany et al. | 375/225 |
| 6,658,024 B1* | 12/2003 | Okamura | 370/468 |
| 6,747,992 B1* | 6/2004 | Matsumoto | 370/468 |
| 6,791,995 B1* | 9/2004 | Azenkot et al. | 370/436 |
| 6,801,570 B2* | 10/2004 | Yong | 375/219 |
| 6,804,267 B1* | 10/2004 | Long et al. | 370/524 |
| 7,133,441 B1* | 11/2006 | Barlev et al. | 375/222 |
| 2002/0008525 A1* | 1/2002 | Seagraves et al. | 324/500 |
| 2002/0034196 A1* | 3/2002 | Tzannes | 370/529 |
| 2002/0064219 A1* | 5/2002 | Paik et al. | 375/222 |
| 2002/0181609 A1* | 12/2002 | Tzannes | 375/295 |
| 2003/0189952 A1* | 10/2003 | Long et al. | 370/503 |
| 2003/0219076 A1* | 11/2003 | Jeong et al. | 375/260 |
| 2004/0136405 A1* | 7/2004 | Long et al. | 370/503 |
| 2004/0141519 A1 | 7/2004 | Greenfield et al. | |
| 2004/0196938 A1* | 10/2004 | Long et al. | 375/371 |

OTHER PUBLICATIONS

European Search Report issued Jun. 2, 2008 for Appl. No. EP 04015149,4 pages.

Walton, R. et al., "Performance of a Multi-Rate CDMA Packet Data System," The Ninth IEEE International Symposium on Personal, Indoor and Mobile Radio Communications, vol. 2, Sep. 8-11, 1998, pp. 841-847.

* cited by examiner

APPARATUS AND METHOD FOR LATENCY CONTROL IN A COMMUNICATIONS SYSTEM

CROSS-REFERENCE TO RELATED APPLICATIONS

This application claims priority from U.S. provisional application Nos. 60/483,450 filed on Jun. 30, 2003, and titled "Apparatus And Method For Latency Control In A Communications System", and No. 60/483,623 filed on Jul. 1, 2003, and titled "Apparatus And Method For Latency Control In A Communications System", which are incorporated by reference herein in their entirety.

BACKGROUND OF THE INVENTION

1. Field of the Invention

This invention relates to communications systems, and in particular to adaptive rate communications systems that suffer time varying noise conditions, such as Annex C ADSL (Asymmetric Digital Subscriber Line) systems.

2. Related Art

In ADSL systems (e.g., using the G.992.1 and G.992.2 standard, etc.), data processing generally might be byte oriented (e.g., octet oriented). All of the bit-level processing in both the fast and interleaved transmit data paths of such systems is performed in groups of 8. The 8-bit bytes from both paths are combined and inserted into symbols in the tone ordering block (cf. FIG. 5-1 in G.992.1). Therefore, the number of bits per symbol in such systems always is a multiple of 8. One problem with such systems is that some data capacity is wasted because of the inherent 8-bit data restriction.

Figure 1:
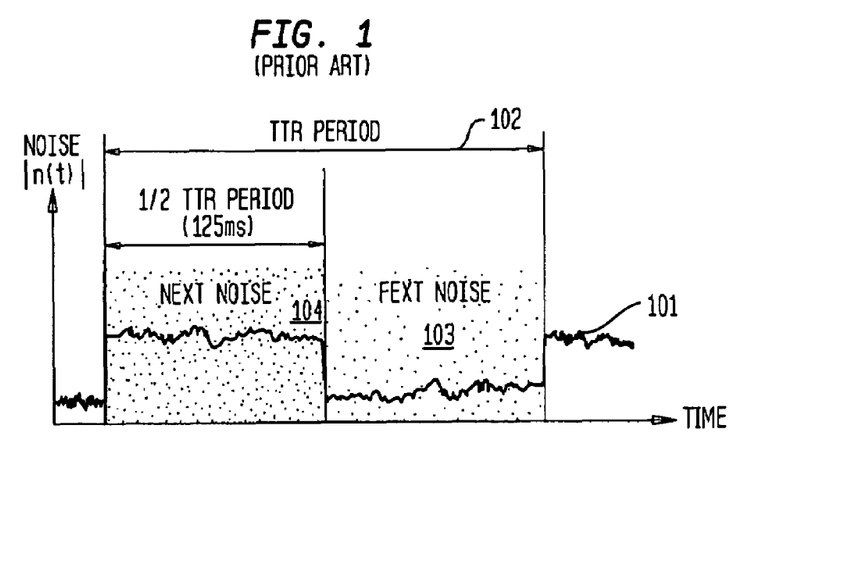
FIG. 1 is a plot depicting TCM (Time Compression Multiplex)-ISDN crosstalk noise.

Annex C ADSL operates over twisted pairs that are bundled with Japanese ISDN-carrying twisted pairs. FIG. 1 is a plot depicting TCM (Time Compression Multiplex)-ISDN crosstalk noise. The crosstalk noise 101 generated by the ISDN twisted pairs is time varying, and is synchronous to a clock, called a TTR clock, having a time period 102. The TTR clock is an example of a noise clock.

Unlike an Annex C ADSL system, an Annex A ADSL system has no means of synchronization to a TTR clock and, indeed, cannot handle a time varying noise source. Thus all computations in an Annex A ADSL system such as the computations used for the derivation of equalizers (gain adjust, bit allocation, etc.) are based on a continuous average measure of the noise environment.

By contrast, an Annex C ADSL system implements two different receivers, each optimized to the characteristics of its associated noise phase. While Annex C ADSL adapts better to time varying noise than Annex A ASDL, a drawback with Annex C ASDL is that the instantaneous bit rate varies in each phase. In order to achieve a constant bit rate, significant buffering is needed, which causes latency added to the data transmission. In some applications, the additional latency is unacceptable. Thus a fallback position is to use an Annex A ASDL solution, where disadvantages in handling time varying noise are to be expected.

SUMMARY OF THE INVENTION

In one variant, the present invention provides a method for controlling transmission latency in a communications system in which the communications system is subject to a noise signal having at least a first noise phase and a second noise phase. The method includes determining a first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency; and transmitting symbols at the first bit rate during the first noise phase and at the second bit rate during the second noise phase.

In another variant, the invention provides an apparatus which includes a constrained rate receiver for determining a first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency; and, a constrained rate transmitter for transmitting symbols at the first bit rate during the first noise phase and at the second bit rate during the second noise phase.

In yet another variant, the invention provides a constrained rate receiver that is adapted to determine a first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency.

In yet a further variant, the invention provides a signal in a communications system, wherein the communications system is subject to a noise signal having at least a first noise phase and a second noise phase. The signal includes a determined first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency; and, symbols transmitted at the first bit rate during the first noise phase and at the second bit rate during the second noise phase, such that the transmission latency in the communications system can be controllable.

These and other variants of the invention are described in the accompanying drawings and remainder of the specification and the claims.

DETAILED DESCRIPTION OF THE PREFERRED EMBODIMENTS

The invention provides a method for controlling transmission latency in a communications system, wherein the communications system is subject to a noise signal having at least a first noise phase and a second noise phase. The method includes determining a first bit rate for symbols transmitted during the first noise phase, and a second bit rate for symbols transmitted during the second noise phase. The first bit rate and the second bit rate are constrained such that a transmission latency does not exceed a pre-determined maximum allowed transmission latency. The method also includes transmitting symbols at the first bit rate during the first noise phase and at the second bit rate during the second noise phase. The method includes communicating the predetermined maximum allowed transmission latency via a message to a receiver of the communications system, and optionally configuring, in accordance with the first bit rate, a first bit allocation table for symbols transmitted during the first noise phase; and configuring, in accordance with the second bit rate, a second bit allocation table for symbols transmitted during the second noise phase.

In one variant, the first noise phase corresponds to a first signal-to-noise ratio, and the second noise phase corresponds to a second signal-to-noise ratio. The second signal-to-noise ratio is higher than the first signal-to-noise ratio. The method also includes determining the second bit rate based on the second signal-to-noise ratio.

In another aspect, the method includes determining the first bit rate based on the second bit rate and the pre-determined maximum allowed transmission latency. The first bit rate is determined in accordance with the following equation:

$$R_1 = -R_2 * \frac{S_2}{S_1} * \frac{\text{latency} * C + \text{SymTime} * S_1}{\text{latency} * C - \text{SymTime} * S_2}$$

$R_1$ is the first bit rate. $R_2$ is the second bit rate. Latency is the predetermined maximum allowed transmission latency, and SymTime is a discrete multi-tone symbol duration for $S_2$ symbols of the second noise phase transmitted during a number C of noise clock cycles and $S_1$ symbols of the first noise phase transmitted during the number C of noise clock cycles.

The communications system is an adaptive rate communications system in one variant. In another variant, the communications system is an asymmetric digital subscriber line communications system or the communications system is an Annex C asymmetric digital subscriber line communications system.

The first noise phase is a far end cross talk noise phase. The second noise phase is a near end cross talk noise phase. The noise signal results from noise from a Time Compressed Multiplex-Integrated Switched Digital Network signal.

The first bit rate and the second bit rate are determined in accordance with the following equation:

$$\text{latency} = \frac{(R_1 - R_2) * T_2 * T_1}{R_1 T_1 + R_2 T_2}$$

Latency is the predetermined maximum allowed transmission latency. $R_1$ is the first bit rate. $R_2$ is the second bit rate. $T_1$ is a first time period corresponding to the first noise phase, and $T_2$ is a second time period corresponding to the second noise phase.

An apparatus for controlling transmission latency in a communications system, wherein the communications system is subject to a noise signal having at least a first noise phase and a second noise phase is also provided. The apparatus comprises a constrained rate receiver for determining a first bit rate for symbols transmitted during the first noise phase, and a second bit rate for symbols transmitted during the second noise phase. The first bit rate and the second bit rate are constrained such that a transmission latency does not exceed a pre-determined maximum allowed transmission latency.

Figure 2:
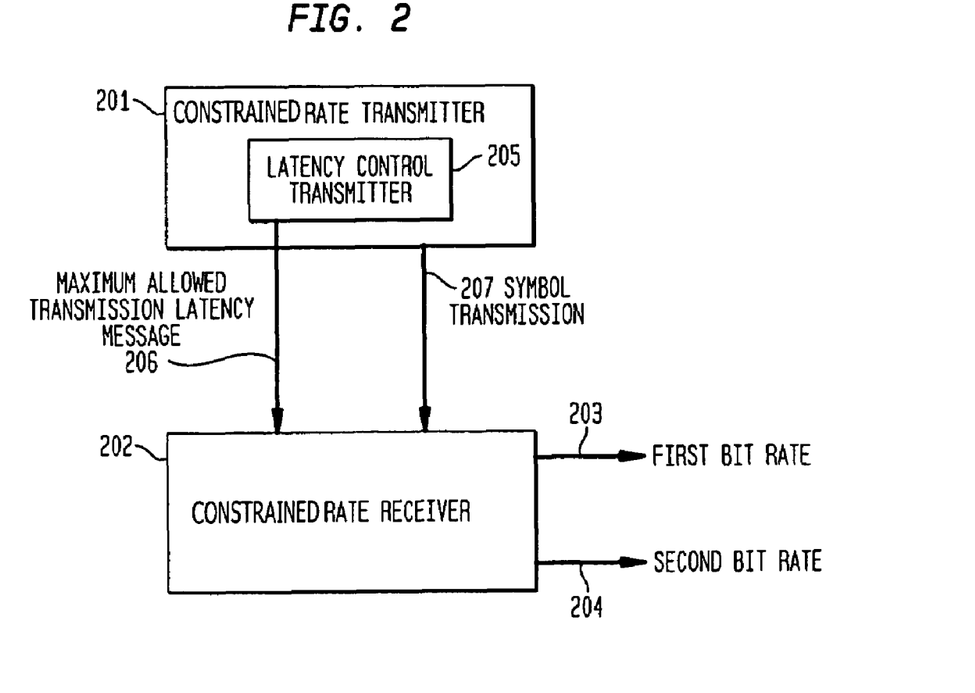
FIG. 2 shows a communications system with a constrained rate receiver for determining constrained bit rates for controlling transmission latency, in accordance with an embodiment of the invention.

A constrained rate transmitter for transmitting symbols at the first bit rate during the first noise phase and at the second bit rate during the second noise phase is also part of the apparatus. FIG. 2 shows a communications system with a constrained rate receiver 202 for determining constrained bit rates for controlling transmission latency, in accordance with an embodiment of the invention. In this embodiment, a constrained rate receiver 202 determines a first bit rate 203 for symbols transmitted during a first noise phase, and a second bit rate 204 for symbols transmitted during a second noise phase. The first and second noise phase may, for example, be the FEXT noise phase 103 and NEXT noise phase 104 of FIG. 1. The constrained rate receiver 202 determines the first bit rate 203 and second bit rate 204 so that they are constrained such that the latency of the transmission does not exceed a pre-determined maximum allowed transmission latency. A constrained rate transmitter 201 is therefore able to transmit symbols 207 at the first bit rate 203 during the first noise phase and at the second bit rate 204 during the second noise phase, without exceeding the pre-determined maximum allowed transmission latency. The constrained rate transmitter 201 may transmit the pre-determined maximum allowed latency to the constrained rate receiver 202 via a message 206, which may be a message similar, for example, to the C-MSG1 message defined in the G.992.2 ITU standard.

The constrained rate transmitter further comprises a latency control transmitter 205 for communicating the predetermined maximum allowed transmission latency via a message to the constrained rate receiver. Optionally, the constrained rate receiver further includes a first bit allocation table controller for configuring, in accordance with the first bit rate, a first bit allocation table for symbols transmitted during the first noise phase; and, a second bit allocation table controller for configuring, in accordance with the second bit rate, a second bit allocation table for symbols transmitted during the second noise phase.

The first noise phase corresponds to a first signal-to-noise ratio, and the second noise phase corresponds to a second signal-to-noise ratio, the second signal-to-noise ratio being higher than the first signal-to-noise ratio in one variant of the invention. The constrained rate receiver optionally further comprises a second bit rate controller for determining the second bit rate based on the second signal-to-noise ratio. Alternatively, the constrained rate receiver further comprises a first bit rate controller for determining the first bit rate based on the second bit rate and the pre-determined maximum allowed transmission latency. The first bit rate controller comprises a controller for determining the first bit rate in accordance with the following equation:

$$R_1 = -R_2 * \frac{S_2}{S_1} * \frac{\text{latency} * C + \text{SymTime} * S_1}{\text{latency} * C - \text{SymTime} * S_2}$$

where $R_1$ is the first bit rate, $R_2$ is the second bit rate, latency is the predetermined maximum allowed transmission latency, and SymTime is a discrete multi-tone symbol duration, for $S_2$ symbols of the second noise phase transmitted during a number C of noise clock cycles and $S_1$ symbols of the first noise phase transmitted during the number C of noise clock cycles.

The communications system is an adaptive rate communications system, is an asymmetric digital subscriber line communications system, or an Annex C asymmetric digital subscriber line communications system. The first noise phase is a far end cross talk noise phase. The second noise phase is a near end cross talk noise phase. The noise signal results from noise from a Time Compressed Multiplex-Integrated Switched Digital Network signal. The constrained rate receiver comprises a controller for determining the first bit rate and the second bit rate in accordance with the following equation:

$$\text{latency} = \frac{(R_1 - R_2) * T_2 * T_1}{R_1 T_1 + R_2 T_2}$$

where latency is the predetermined maximum allowed transmission latency, $R_1$ is the first bit rate, $R_2$ is the second bit rate, $T_1$ is a first time period corresponding to the first noise phase, and $T_2$ is a second time period corresponding to the second noise phase.

In another variant, the invention provides a constrained rate receiver for controlling transmission latency in a communications system, wherein the communications system is subject to a noise signal having at least a first noise phase and a second noise phase. The receiver is adapted to determine a first bit rate for symbols transmitted during the first noise phase, and a second bit rate for symbols transmitted during the second noise phase. The first bit rate and the second bit rate are constrained such that a transmission latency does not exceed a pre-determined maximum allowed transmission latency.

In a further variant, a constrained rate transmitter in a communications system is provided, wherein the communications system is subject to a noise signal having at least a first noise phase and a second noise phase for transmitting symbols at the first bit rate during the first noise phase and at the second bit rate during the second noise phase, whereby the first bit rate and the second bit rate are determined in a constrained rate receiver described herein. A transmitter optionally includes a latency control transmitter for communicating the predetermined maximum allowed transmission latency via a message to a constrained rate receiver, and is optionally capable of receiving a message communicating the predetermined maximum allowed transmission latency.

A constrained rate receiver includes a first bit allocation table controller for configuring, in accordance with the first bit rate, a first bit allocation table for symbols transmitted during the first noise phase; and a second bit allocation table controller for configuring, in accordance with the second bit rate, a second bit allocation table for symbols transmitted during the second noise phase. The first noise phase optionally corresponds to a first signal-to-noise ratio, and the second noise phase corresponds to a second signal-to-noise ratio. The second signal-to-noise ratio is higher than the first signal-to-noise ratio. also includes a second bit rate controller for determining the second bit rate based on the second signal-to-noise ratio. The constrained rate receiver also optionally includes a first bit rate controller for determining the first bit rate based on the second bit rate and the pre-determined maximum allowed transmission latency. The first bit rate controller comprises a controller for determining the first bit rate in accordance with the following equation:

$$R_1 = -R_2 * \frac{S_2}{S_1} * \frac{\text{latency} * C + \text{SymTime} * S_1}{\text{latency} * C - \text{SymTime} * S_2}$$

where $R_1$ is the first bit rate, $R_2$ is the second bit rate, latency is the predetermined maximum allowed transmission latency, and SymTime is a discrete multi-tone symbol duration, for $S_2$ symbols of the second noise phase transmitted during a number C of noise clock cycles and $S_1$ symbols of the first noise phase transmitted during the number C of noise clock cycles.

The constrained rate receiver operates in a communications system which is an adaptive rate communications system. The communications system is optionally an asymmetric digital subscriber line communications system, or an Annex C asymmetric digital subscriber line communications system. The first noise phase is a far end cross talk noise phase. The second noise phase is a near end cross talk noise phase. The noise signal results from noise from a Time Compressed Multiplex-Integrated Switched Digital Network signal.

A constrained rate receiver includes a first bit allocation table controller for configuring, in accordance with the first bit rate, a first bit allocation table for symbols transmitted during the first noise phase; and a second bit allocation table controller for configuring, in accordance with the second bit rate, a second bit allocation table for symbols transmitted during the second noise phase. The first noise phase optionally corresponds to a first signal-to-noise ratio, and the second noise phase corresponds to a second signal-to-noise ratio. The second signal-to-noise ratio is higher than the first signal-to-noise ratio. The constrained rate receiver also includes a second bit rate controller for determining the second bit rate based on the second signal-to-noise ratio. The constrained rate receiver also optionally includes a first bit rate controller for determining the first bit rate based on the second bit rate and the pre-determined maximum allowed transmission latency. The first bit rate controller comprises a controller for determining the first bit rate in accordance with the following equation:

$$R_1 = -R_2 * \frac{S_2}{S_1} * \frac{\text{latency} * C + \text{SymTime} * S_1}{\text{latency} * C - \text{SymTime} * S_{21}}$$

In yet another variant, the invention provides a signal in a communications system, wherein the communications system is subject to a noise signal having at least a first noise phase and a second noise phase. The signal includes a determined first bit rate for symbols transmitted during the first noise phase, and a second bit rate for symbols transmitted during the second noise phase. The first bit rate and the second bit rate are constrained such that a transmission latency does not exceed a pre-determined maximum allowed transmission latency. The signal also includes symbols transmitted at the first bit rate during the first noise phase and at the second bit rate during the second noise phase, such that the transmission latency in the communications system can be controllable.

Optionally, the signal includes a message representing the predetermined maximum allowed transmission latency. The symbols transmitted during the first noise phase from a first bit allocation table are configured in accordance with the first bit rate; and the symbols transmitted during the second noise phase from a second bit allocation table are configured in accordance with the second bit rate. The first noise phase corresponds to a first signal-to-noise ratio, and the second noise phase corresponds to a second signal-to-noise ratio. The second signal-to-noise ratio is higher than the first signal-to-noise ratio, such that the second bit rate is determined on the basis of the second signal-to-noise ratio. The first bit rate is determined on the basis of the second bit rate and the predetermined maximum allowed transmission latency. The first bit rate is determined in accordance with the following equation:

$$R_1 = -R_2 * \frac{S_2}{S_1} * \frac{\text{latency} * C + \text{SymTime} * S_1}{\text{latency} * C - \text{SymTime} * S_2}$$

where $R_1$ is the first bit rate, $R_2$ is the second bit rate, latency is the predetermined maximum allowed transmission latency, and SymTime is a discrete multi-tone symbol duration, for $S_2$ symbols of the second noise phase transmitted during a number C of noise clock cycles and $S_1$ symbols of the first noise phase transmitted during the number C of noise clock cycles.

The signal is transmitted in a communications system that is an adaptive rate communications system, transmitted in a communications system that is an asymmetric digital subscriber line communications system, and/or transmitted in a communications system that is an Annex C asymmetric digital subscriber line communications system. The first noise phase is a far end cross talk noise phase. The second noise phase is a near end cross talk noise phase. The noise signal results from noise from a Time Compressed Multiplex-Integrated Switched Digital Network signal. The first bit rate and the second bit rate are determined in accordance with the following equation:

$$\text{latency} = \frac{(R_1 - R_2) * T_2 * T_1}{R_1 T_1 + R_2 T_2}$$

where latency is the predetermined maximum allowed transmission latency, $R_1$ is the first bit rate, $R_2$ is the second bit rate, $T_1$ is a first time period corresponding to the first noise phase, and $T_2$ is a second time period corresponding to the second noise phase.

In one variant, the FEXT and NEXT phase DMT symbols (Far End Cross-talk and Near End Cross-talk phase Discrete Multi-tone symbols) in an Annex C ADSL communications system are configured to have constrained bit rates, such that the system latency is kept within a specified limit. This solution employs the extra flexibility of Annex C processing, but constrains the values obtained for FEXT and NEXT bit maps such that the overall delay is kept to a specified amount.

One variant is referred to herein as a 'Constrained Rate Bitmap Mode' (CRBM). This permits the control of transmission latencies for an ADSL system operating in the presence of time varying TCM-ISDN (Time Compressed Multiplex-Integrated Switched Digital Network) noise.

Figure 3:
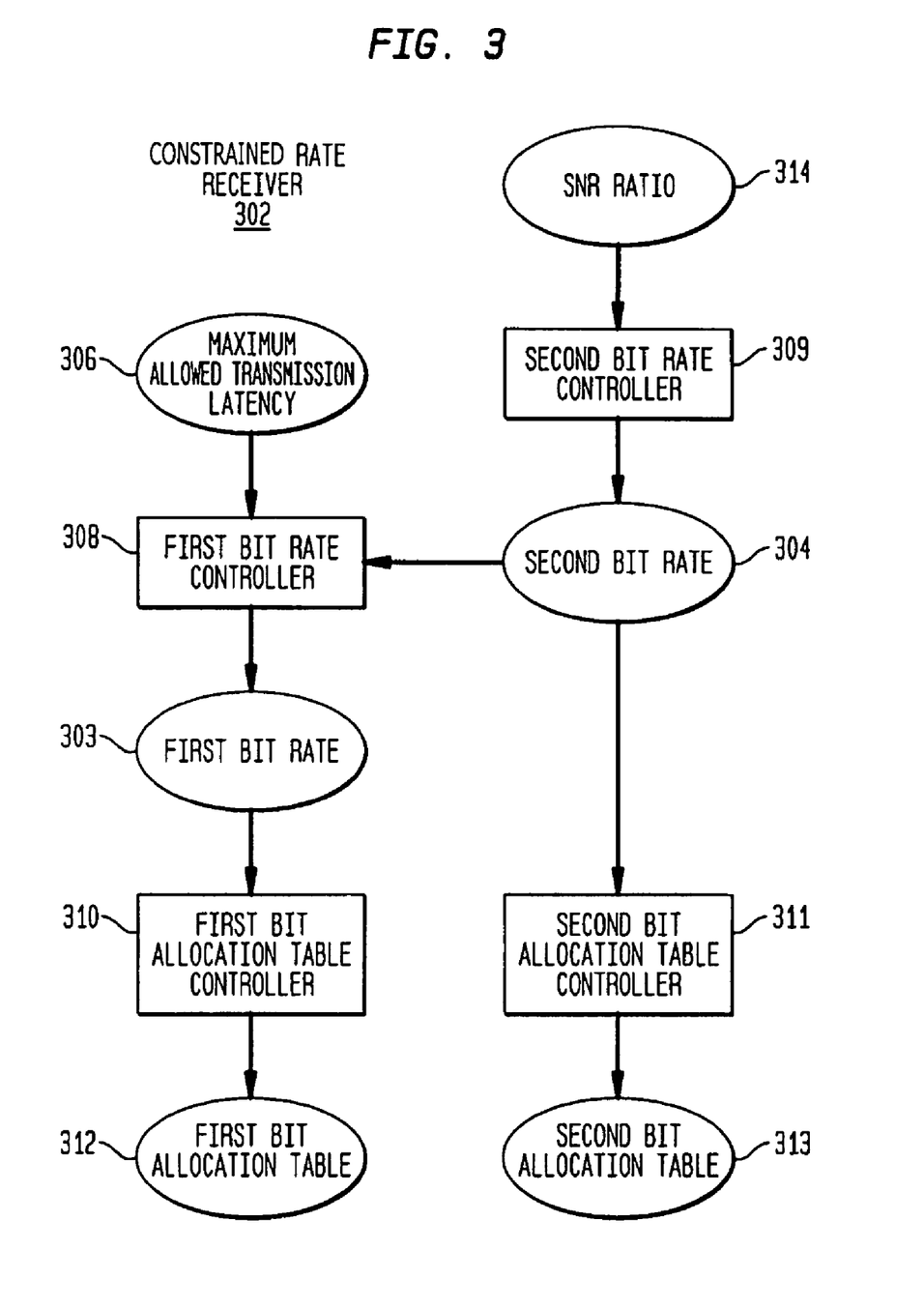
FIG. 3 shows a constrained rate receiver for determining bit rates and bit allocation tables based on a signal-to-noise ratio and a maximum allowed transmission latency, in accordance with an embodiment of the invention.

FIG. 3 shows a constrained rate receiver 302 for determining bit rates and bit allocation tables based on a signal-to-noise ratio and a maximum allowed transmission latency, in accordance with an embodiment of the invention. In this embodiment, the signal-to-noise ratio during one noise phase is higher than in the other noise phase. For example, with reference to FIG. 1, the signal-to-noise ratio during the NEXT noise phase 104 is optionally lower than the signal-to-noise ratio during the FEXT noise phase 103. In the embodiment of FIG. 3, the signal-to-noise ratio 314 of the worse phase (i.e. the phase with the lowest signal-to-noise ratio, such as the NEXT noise phase 104 of FIG. 1) is used by a bit rate controller 309 to determine, for that phase, a bit rate 304 (here designated the second bit rate 304, determined by the second bit rate controller 309). Based on the second bit rate 304 and the maximum allowed transmission latency 306, a first bit rate controller 308 determines the bit rate 303 (here designated the first bit rate 303) for the other phase (for example, the FEXT noise phase 103 of FIG. 1).

In FIG. 3, the first bit rate controller 308, for example, calculates the first bit rate 303 based on the equation:

$$R_1 = -R_2 * \frac{S_2}{S_1} * \frac{\text{latency} * C + \text{SymTime} * S_1}{\text{latency} * C - \text{SymTime} * S_2}$$

where $R_1$ is the first bit rate 303, $R_2$ is the second bit rate 304, latency is the predetermined maximum allowed transmission latency 306, and SymTime is a discrete multi-tone symbol duration, for a number of $S_2$ symbols of the second noise phase transmitted during the number of C noise clock cycles and the number of $S_1$ symbols of the first noise phase transmitted during the number of C noise clock cycles.

Once the first bit rate 303 and the second bit rate 304 are calculated, the embodiment of FIG. 3 uses first and second bit allocation table controllers 310 and 311 to calculate first and second bit allocation tables 312 and 313 for symbols transmitted during the first and second noise phases.

Figure 4:
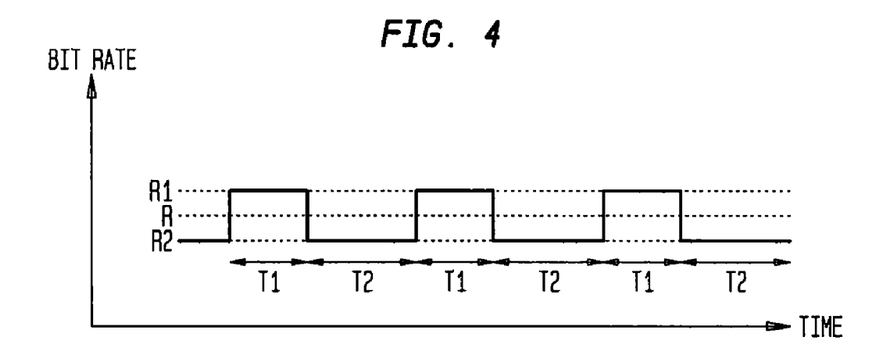
FIG. 4 is a schematic diagram illustrating a time variant bit rate.

In order to derive the equation given above for calculating the first bit rate 303 in the embodiment of FIG. 3, we note that, in an Annex C solution, i.e. dual bit map operation, the consequence of a time varying noise environment is that of a time varying bit rate. To illustrate the effect of this, we consider a general system with two different bit rates that will be applied periodically in time, i.e. the bit rate $R_1$ is applied during a period $T_1$ and the bit rate R2 which is smaller than $R_1$ is applied during a period $T_1$ Such a scenario is illustrated in FIG. 4.

The average bit rate is optionally computed according to the following equation:

$$R = (R_1 T_1 + R_2 T_2)/(T_1 + T_2).$$

Figure 5:
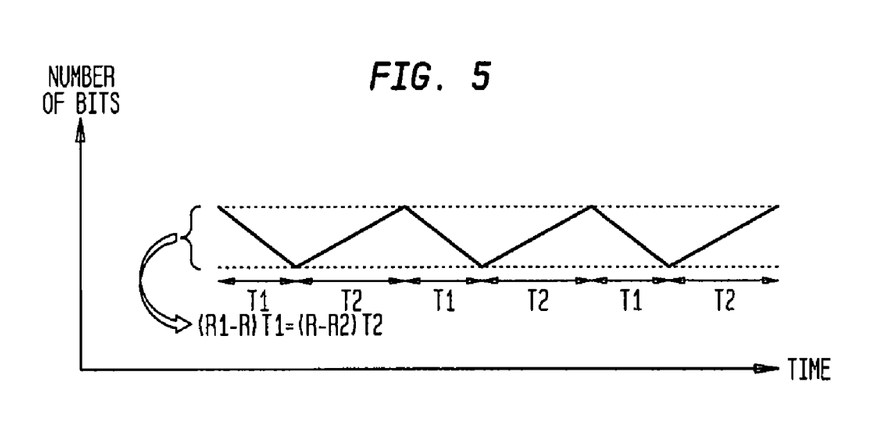
FIG. 5 is a schematic diagram of a buffer dynamic.
Figure 6:
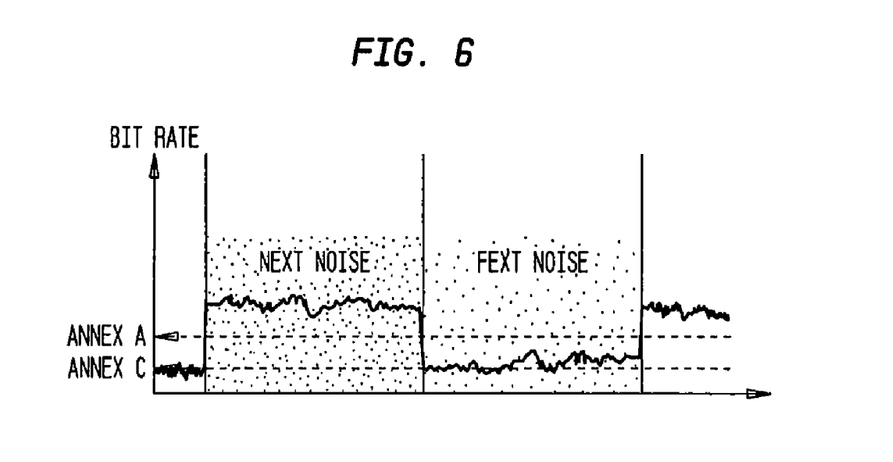
FIG. 6 is a plot showing Annex A ADSL and Annex C ADSL Bit rate computation in the presence of TCM (Time Compression Multiplex)-ISDN noise.

Considering now—as shown in FIG. 5—the buffer converting the average bit rate R to the instantaneous bit rates $R_1$ and $R_2$, the number of bits in the buffer decrease by $(R_1-R)*T_1$ bits during the period $T_1$ and increase again by $(R-R_2)*T_2$ bits during the period $T_2$. Thus, the size of this buffer must be at least $$\text{size\_buffer} = \frac{(R_1 - R_2)}{T_1 + T_2} T_1 T_2 \text{ bits} \qquad (1)$$

and the jittering delay is equal to $$\text{latency} = \frac{(R_1 - R_2)}{R_1 T_1 + R_2 T_2} T_2 T_1 \quad \text{sec} \qquad (2)$$

The jittering delay (latency) is 0 if both bit rates are equal, but otherwise it depends on the instantaneous bit rates and the duration of each period.

In the context of an Annex C system, the periods $T_1$ and $T_2$ depend on which cycle of the TTR clock the DMT symbol falls. To simplify an understanding of the process, we can consider that the number of FEXT and NEXT symbols can be fractional in each TTR clock cycle. Therefore, in this example we have 126 FEXT symbols and 214 NEXT symbols in a hyperframe of 340 useful symbols (excluding SYNC symbols), which span 34 TTR clock cycles. In one TTR clock cycle, we have on average, 126/34 FEXT symbols and 214/34 NEXT symbols. Rearranging Eq. 2 (and replacing $R_1$ with RFEXT, $R_2$ with RNEXT) gives the latency incurred by the Annex C rate converter as:

$$\text{latency} = \frac{(R_{FEXT} - R_{NEXT})}{126 * R_{FEXTI} + 214 * R_{NEXT}} \cdot \frac{126 * 214}{34} \cdot SymTimes \qquad (3)$$

where RFEXT is the instantaneous bit rate of FEXT symbols (which equals nFext*4 kbps), RNEXT is the instantaneous bit rate of NEXT symbols (which equals nNext*4 kbps), and SymTime is the DMT symbol duration. As an example, with RFEXT=4 Mbps and RNEXT=3 Mbps, the latency is 0.17 ms.

The amount of delay is completely determined by the mean bit rate and by the difference in bit rates between the FEXT and NEXT symbols. Thus, the amount of delay can be controlled by the receiver while computing the bit allocation tables for FEXT and NEXT.

In practice, the mean bit rate is determined by the SNR (Signal-to-Noise Ratio) measured in the worst phase (typically the NEXT phase) and by the maximum allowed latency. For example, if the NEXT phase SNR can accommodate a bit rate of 1 MBps and the maximum allowed latency is 100□s, rearranging Eq. 3 we get $$R_{FEXT} = -R_{NEXT} \cdot \frac{214}{126} \cdot \frac{(\text{latency} * 34 + SymTime * 126)}{\text{latency} * 34 - SymTime * 214)} bs^{-1} \qquad (4)$$

giving a FEXT bit rate of 1.18 Mbps. In this case, the mean bit rate is 1.07 Mbps, as opposed to a rate of 1 Mbps that would be obtained using a single bit map mode approach. As demonstrated by the above example, the additional control leads to a significant improvement in attained bit rates over a pure Annex A solution, while maintaining an acceptable overall latency, as required by the specific application. Equation 4 is expressed more generally as described in connection with the embodiment of FIG. 3.

In order to derive the equation given above for calculating the first bit rate 303 in the embodiment of FIG. 3, we note that, in an Annex C solution, i.e. dual bit map operation, the consequence of a time varying noise environment is that of a time varying bit rate. To illustrate the effect of this, we consider a general system with two different bit rates that will be applied periodically in time, i.e. the bit rate $R_1$ is applied during a period $T_1$ and the bit rate $R_2$ which is smaller than $R_1$ is applied during a period $T_2$ Such a scenario is illustrated in FIG. 4.

Figure 7:
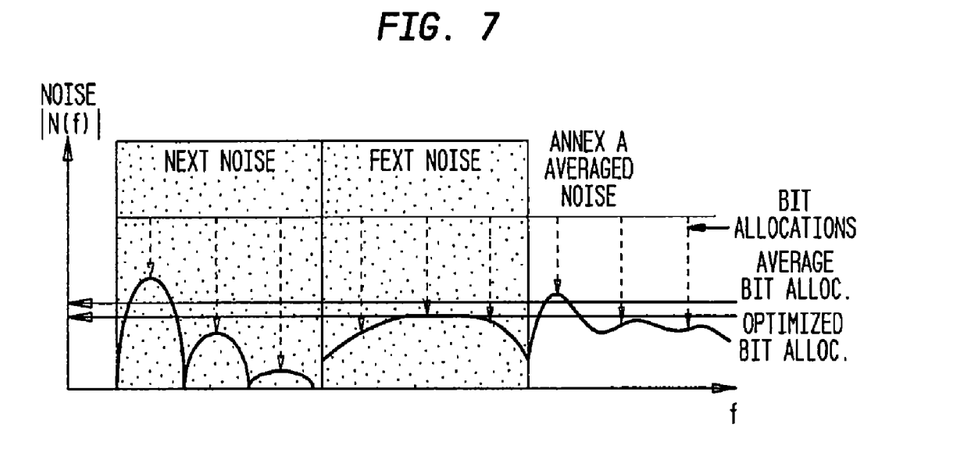
FIG. 7 is a plot showing spectral properties of NEXT, FEXT and averaged TCM-ISDN noise.

Moreover, although the bit rates in both phases are identical, the bit allocation maps need not be. TCM-ISDN noise is non-white. With respect to the scenario depicted in FIG. 7, an Annex A solution will derive an average spectral map of the NEXT and FEXT noise phase characteristics. This average will in no way be optimal in either context. A CRBM solution, in accordance with an embodiment of the invention, allows optimization of all aspects of the signal processing chain to the precise noise conditions measured in each phase. Thus, the bit rate performance is expected to exceed that which may be obtained by the Annex A approach.

Advantages of the preferred CRBM over standard Annex A and Annex C solutions, in accordance with an embodiment of the invention, include:

1. No requirement to have Annex A/C dynamically configurable.

2. The optimum rate versus latency is computed at run time.

3. The bit rates will be optimized to TCM noise environments.

This will offer more robust transmission than can be obtained using Annex A bit rate computation algorithms.

4. The individual FEXT/NEXT bit maps will be optimized to the precise noise characteristics measured on each phase—under TCM noise conditions these will differ. Again, this is not achievable under Annex A modes of operation.

Figure 8:
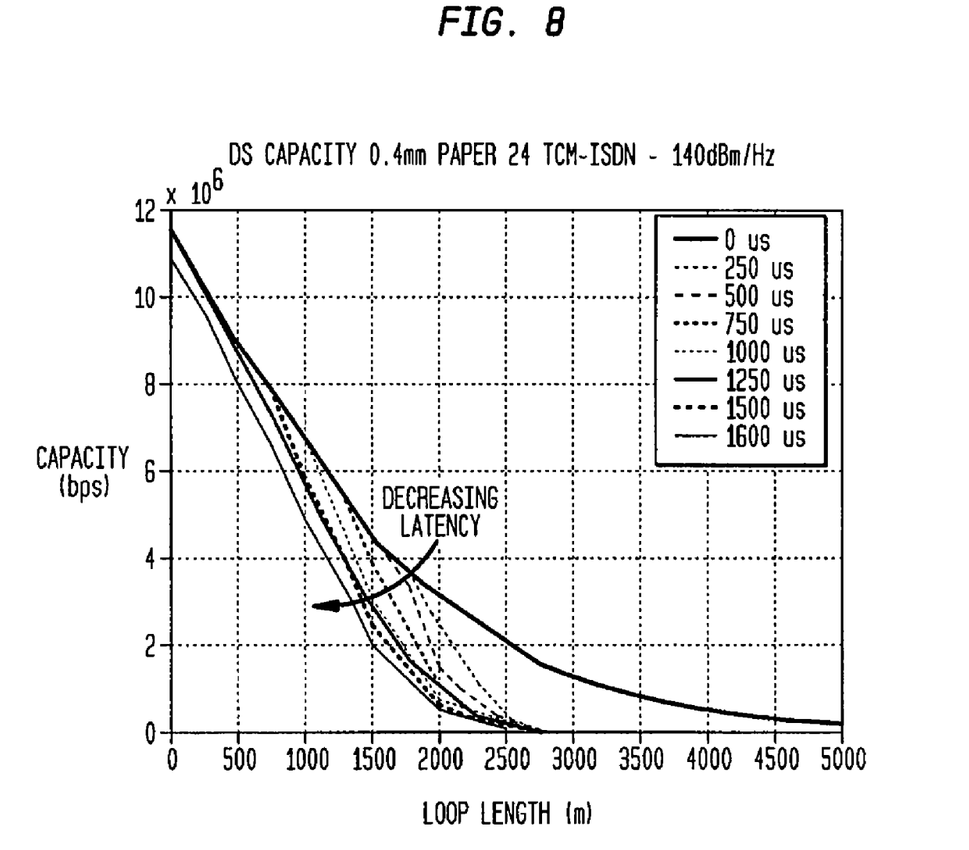
FIG. 8 shows simulation results of loop length against bit rate for varying rate converter latencies in the presence of ISDN noise.

To illustrate that the additional control of CRBM in an embodiment of the invention can lead to a significant improvement in attained bit rates over a pure Annex A solution, while maintaining an acceptable overall latency, FIG. 8 summarizes the performance of a system with various amounts of latency, namely 1600 μs, 1500 μs, 1250 μs, 1000 μs, 750 μs, 500 μs, 250 μs and no latency (0 μs). The environment is 0.4 mm paper insulated cable with 24 TCM-ISDN noise and a −140 dBm/Hz background noise and target margin 6 dB. Note that for delay above 1.5735 ms, the NEXT capacity can be equal to 0, and the full bit rate of DBM is thus achievable. In all other cases the NEXT bit rates should be above 0. This explains the sharp drop at 2750 m.

Thus the invention provides a method of, and system for, controlling the latency introduced by the Rate Converter buffering in Annex C ADSL systems operating in the presence of time varying TCM-ISDN noise. It has been demonstrated that in the presence of time varying noise TCM-ISDN, a dual bit map approach offers superior performance to a single bit map approach when the NEXT and FEXT symbol bit rates are constrained to be the same. Further, by introducing a latency control parameter we can improve on the attained bit rates while maintaining a specified overall bit rate.

Currently there are a number of proposals for extending the Japanese version of ADSL, known as ANNEX_C. The extensions put forward are Annexes I, J, and K. The invention applies in communications apparatus or protocols according to any such standards or future equivalents. Furthermore, there is proposed a new Annex A standard, known as G.992.3 (ADSL2) from the ITU, and various proposals for an Annex C version of this to which preferred embodiments could apply. In future Annex C developments, an additional latency parameter should be communicated via one of the messages, for example in the C-MSG1 as defined in the G992.2 ITU standard, permitting the benefits outlined in this document to be incorporated current and future standards.

In one variant the invention provides a method for determining a first bit rate for symbols transmitted during the first noise phase, and a second bit rate for symbols transmitted during the second noise phase, the first bit rate and the second bit rate being constrained such that a transmission latency does not exceed a pre-determined maximum allowed transmission latency; and transmitting symbols at the first bit rate during the first noise phase and at the second bit rate during the second noise phase. The method optionally comprises communicating the predetermined maximum allowed transmission latency via a message to a receiver of the communications system. The method optionally comprises configuring, in accordance with the first bit rate, a first bit allocation table for symbols transmitted during the first noise phase; and configuring, in accordance with the second bit rate, a second bit allocation table for symbols transmitted during the second noise phase. If the first noise phase corresponds to a first signal-to-noise ratio, and the second noise phase corresponds to a second signal-to-noise ratio that is higher than the first signal-to-noise ratio. The second bit rate is determined based on the second signal-to-noise ratio; and the first bit rate is determined based on the second bit rate and the pre-determined maximum allowed transmission latency. In particular, the first bit rate is optionally determined in accordance with the following equation:

$$R_1 = -R_2 * \frac{S_2}{S_1} * \frac{\text{latency} * C + \text{SymTime} * S_1}{\text{latency} * C - \text{SymTime} * S_2}$$

In a further related variant, the communications system is an adaptive rate communications system; and in particular is an asymmetric digital subscriber line (ADSL) communications system, such as an Annex C ADSL system. The first noise phase may be a far end cross talk noise phase, and the second noise phase may be a near end cross talk noise phase. The noise signal may result from noise from a Time Compressed Multiplex-Integrated Switched Digital Network signal.

In another related method embodiment, the first bit rate and the second bit rate are determined in accordance with the following equation:

$$\text{latency} = \frac{(R_1 - R_2) * T_2 * T_1}{R_1 T_1 + R_2 T_2}$$

where latency is the predetermined maximum allowed transmission latency, $R_1$ is the first bit rate, $R_2$ is the second bit rate, $T_1$ is a first time period corresponding to the first noise phase, and $T_2$ is a second time period corresponding to the second noise phase.

A skilled reader will appreciate that, while the foregoing has described what is considered to be the best mode and where appropriate other modes of performing the invention, the invention is not limited to specific apparatus configurations or method steps disclosed in this description of the preferred embodiment. Those skilled in the art will also recognise that the invention has a broad range of applications, not necessarily connected with ADSL or even DSL communications systems, and the embodiments admit of a wide range of modifications without departing from the inventive concepts.

What is claimed is:

1. A transceiver configured to operate in a communications system that is subject to a time varying noise signal having at least a first noise phase and a second noise phase, the transceiver comprising:
a constrained rate transmitter configured to transmit symbols at a first bit rate during the first noise phase and at a second bit rate during the second noise phase;
a constrained rate receiver configured to increase a difference between the first bit rate and the second bit rate while ensuring that a transmission latency, dependent on both the first and second bit rates, does not exceed a pre-determined maximum allowed transmission latency; and
a latency control transmitter configured to communicate the pre-determined maximum allowed transmission latency via a message to the constrained rate receiver.

2. The transceiver according to claim 1, wherein the first noise phase results from far end cross talk noise received at the constrained rate receiver.

3. The transceiver according to claim 1, wherein the second noise phase results from near end cross talk noise received at the constrained rate receiver.

4. The transceiver according to claim 1, wherein the time varying noise signal results from a Time Compressed Multiplex-Integrated Switched Digital Network signal.

5. The transceiver according to claim 1, wherein the communications system is an adaptive rate communications system.

6. The transceiver according to claim 5, wherein the communications system is an asymmetric digital subscriber line communications system.

7. The transceiver according to claim 1, wherein the first noise phase corresponds to a first signal-to-noise ratio, and the second noise phase corresponds to a second signal-to-noise ratio, the second signal-to-noise ratio being higher than the first signal-to-noise ratio.

8. The transceiver according to claim 7, wherein the second bit rate is determined based on the second signal-to-noise ratio.

9. The transceiver according to claim 8, wherein the first bit rate is determined based on the second bit rate and the pre-determined maximum allowed transmission latency.

10. A method for controlling transmission latency in a communications system, wherein the communications system is subject to a time varying noise signal having at least a first noise phase and a second noise phase, the method comprising:
communicating a pre-determined maximum allowed transmission latency via a message to a constrained rate receiver; and
transmitting symbols at a first bit rate during the first noise phase and at a second bit rate during the second noise phase, wherein the transmitting step includes increasing a difference between the first bit rate and the second bit rate while ensuring that a transmission latency, dependent on both the first and second bit rates, does not exceed the pre-determined maximum allowed transmission latency.

11. The method according to claim 10, wherein the first noise phase results from far end cross talk noise received at the constrained rate receiver.

12. The method according to claim 10, wherein the second noise phase results from near end cross talk noise received at the constrained rate receiver.

13. The method according to claim 10, wherein the time varying noise signal results from a Time Compressed Multiplex-Integrated Switched Digital Network signal.

14. The method according to claim 10, wherein the communication system is an adaptive rate communications system.

15. The method according to claim 14, wherein the communications system is an asymmetric digital subscriber line communications system.

16. A transceiver configured to operate in a communication system that is subject to a time varying noise signal having at least a first noise phase and a second noise phase, the transceiver comprising:

a constrained rate transmitter configured to transmit symbols at a first bit rate during the first noise phase and at a second bit rate during the second noise phase;

a constrained rate receiver configured to maximize the difference between the first bit rate and the second bit rate while ensuring that a transmission latency, dependent on both the first and second bit rates, does not exceed a pre-determined maximum allowed transmission latency; and a latency control transmitter configured to communicate the pre-determined maximum allowed transmission latency via a message to the constrained rate receiver.

* * * * *

UNITED STATES PATENT AND TRADEMARK OFFICE
CERTIFICATE OF CORRECTION

| | |
|---|---|
| PATENT NO. | : 7,668,200 B2 |
| APPLICATION NO. | : 10/880769 |
| DATED | : February 23, 2010 |
| INVENTOR(S) | : Greenfield et al. |

It is certified that error appears in the above-identified patent and that said Letters Patent is hereby corrected as shown below:

Column 6, line 4
Replace "noise ration. also" with --noise ration. The constrained rate receiver also--.

Column 8, line 49
Replace "rate R2 which" with --rate $R_2$ which--.

Column 8, line 50
Replace "period $T_1$ Such" with --period $T_2$. Such--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,668,200 B2  Page 1 of 1
APPLICATION NO. : 10/880769
DATED : February 23, 2010
INVENTOR(S) : Greenfield et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Seventh Day of December, 2010

David J. Kappos
*Director of the United States Patent and Trademark Office*